(12) United States Patent
Gustafson

(10) Patent No.: US 11,248,747 B2
(45) Date of Patent: Feb. 15, 2022

(54) LNG DELIVERY SYSTEM WITH SATURATED FUEL RESERVE

(71) Applicant: Chart Inc., Ball Ground, GA (US)

(72) Inventor: Erik Gustafson, Ball Ground, GA (US)

(73) Assignee: Chart Inc., Ball Ground, GA (US)

( * ) Notice: Subject to any disclaimer, the term of this patent is extended or adjusted under 35 U.S.C. 154(b) by 712 days.

(21) Appl. No.: 15/314,875

(22) PCT Filed: May 27, 2015

(86) PCT No.: PCT/US2015/032692
§ 371 (c)(1),
(2) Date: Nov. 29, 2016

(87) PCT Pub. No.: WO2015/183966
PCT Pub. Date: Dec. 3, 2015

(65) Prior Publication Data
US 2017/0108170 A1    Apr. 20, 2017

Related U.S. Application Data

(60) Provisional application No. 62/004,477, filed on May 29, 2014.

(51) Int. Cl.
*F17C 7/04* (2006.01)
*F17C 3/00* (2006.01)

(52) U.S. Cl.
CPC .............. *F17C 7/04* (2013.01); *F17C 3/00* (2013.01); *F17C 2201/035* (2013.01);
(Continued)

(58) Field of Classification Search
CPC ...... F17C 7/02; F17C 7/04; F17C 2227/0107; F17C 2227/04; F17C 2227/041;
(Continued)

(56) References Cited

U.S. PATENT DOCUMENTS

| 5,127,230 | A |   | 7/1992  | Neeser et al. |
| 5,163,409 | A | * | 11/1992 | Gustafson ........... F02D 19/0647 123/525 |
| 5,243,821 | A |   | 9/1993  | Schuck et al. |
| 5,421,160 | A |   | 6/1995  | Gustafson et al. |

(Continued)

FOREIGN PATENT DOCUMENTS

| CN | 2593029 Y  | 12/2003 |
| CN | 1888516 A  | 1/2007  |

(Continued)

OTHER PUBLICATIONS

European Search Report (extended) dated Apr. 12, 2018.
International Search Report Issued in PCT/US2015/032692 dated Aug. 27, 2015.

*Primary Examiner* — John F Pettitt, III
(74) *Attorney, Agent, or Firm* — Cook Alex Ltd.; R. Blake Johnston

(57) ABSTRACT

A cryogenic fluid delivery system includes a main tank system with a main tank adapted to contain a first supply of cryogenic liquid, and reserve tank system with reserve tank adapted to contain a second supply of cryogenic liquid. A pressure building circuit is adapted to delivery vapor to the head space of the main tank to build pressure in the main tank and a fuel delivery line supplies cryogenic fuel from either the main tank or the reserve tank to a use device. The reserve tank stores saturated cryogenic fuel that is delivered to the use device via the fuel delivery line while the cryogenic liquid in the main tank is being saturated. The fluid delivery system automatically switches to delivering cryogenic fuel from the main tank to the use device via the fuel delivery line upon saturation of the cryogenic liquid in the main tank.

12 Claims, 3 Drawing Sheets

(52) U.S. Cl.
CPC .. *F17C 2201/054* (2013.01); *F17C 2201/056* (2013.01); *F17C 2203/0391* (2013.01); *F17C 2203/0629* (2013.01); *F17C 2205/0332* (2013.01); *F17C 2221/033* (2013.01); *F17C 2223/0161* (2013.01); *F17C 2223/033* (2013.01); *F17C 2223/047* (2013.01); *F17C 2225/0123* (2013.01); *F17C 2225/035* (2013.01); *F17C 2225/036* (2013.01); *F17C 2227/0107* (2013.01); *F17C 2227/0121* (2013.01); *F17C 2227/04* (2013.01); *F17C 2250/01* (2013.01); *F17C 2265/066* (2013.01); *F17C 2270/0168* (2013.01)

(58) Field of Classification Search
CPC .......... F17C 2227/042; F17C 2227/043; F17C 2250/061; F17C 2250/0626; F17C 2250/0404; F17C 2250/0408; F17C 2250/0413; F17C 2250/0417
USPC ................ 62/50.2, 50.4, 50.7, 53.2
See application file for complete search history.

(56) References Cited

U.S. PATENT DOCUMENTS

| | | | |
|---|---|---|---|
| 5,421,162 A | | 6/1995 | Gustafson et al. |
| 5,771,946 A | * | 6/1998 | Kooy ................. F17C 6/00 141/82 |
| 6,199,384 B1 | | 3/2001 | Udischas et al. |
| 2002/0153041 A1 | | 10/2002 | Drube et al. |
| 2009/0288426 A1 | | 11/2009 | Lilletvedt et al. |
| 2010/0000232 A1 | | 1/2010 | Valentian |
| 2011/0146605 A1 | | 6/2011 | Dixon et al. |
| 2014/0007943 A1 | * | 1/2014 | Mackey ............... F17C 1/00 137/1 |
| 2014/0096539 A1 | | 4/2014 | Gustafson et al. |
| 2014/0157796 A1 | * | 6/2014 | Drube ................. F17C 7/02 62/49.1 |
| 2014/0190187 A1 | * | 7/2014 | Snyder ................ F17C 7/02 62/49.1 |

FOREIGN PATENT DOCUMENTS

| | | |
|---|---|---|
| CN | 2872057 Y | 2/2007 |
| CN | 103712056 A | 4/2014 |
| EP | 0922901 A2 | 6/1999 |

\* cited by examiner

LNG DELIVERY SYSTEM WITH SATURATED FUEL RESERVE

REFERENCE TO PRIORITY DOCUMENT

This application is a national stage entry, filed under 35 U.S.C. §371, of International Application No. PCT/US2015/032692, filed on May 27, 2015, and claims priority to U.S. Provisional Patent Application Ser. No. 62/004,477 entitled "LNG Delivery System with Saturated Fuel Reserve", filed May 29, 2014. Priority to the aforementioned filing date is claimed and the entire contents of each are incorporated herein by reference in their entireties and for all purposes.

BACKGROUND

This disclosure relates to a system for delivering liquefied natural gas (LNG) from a storage tank to a use device, such as a natural gas powered vehicle engine. The disclosed devices and methods can be used in a variety of environments and are particularly suited for markets in which pre-saturation of the LNG fuel is not performed. The disclosed devices and methods may be used as a source of "trim heat" if the storage tank pressure falls below a pre-defined level.

Many heavy-duty, natural gas fueled vehicle engines require that an intake pressure of natural gas be at a certain value, such as around 100 psig. In most markets, LNG is saturated, or heat is added, to a point at which its vapor pressure is roughly equal to the pressure required by the use device (i.e., the vehicle). This process of building saturation pressure is typically performed at LNG fueling stations. However, there exist some markets in which this saturation of the fuel before transferring it to the vehicle storage tank is not performed or is not performed to an extent great enough to achieve 100 psig saturated liquid in the vehicle tank after fueling. Thus, the storage tank may end up being filled with LNG well below the desired pressure. Additionally, some engines require pressures around 150 psig, which is not readily available, even at fuel stations that saturate the fuel before delivery.

In one proposed solution, compressed natural gas (CNG) is used to add vapor pressure above LNG to deliver the fuel at an elevated pressure. However, this solution requires a second tank for CNG be mounted on the vehicle, which adds weight and occupies valuable space on the vehicle chassis. In another proposed solution, a specialized fuel station sequentially fills the storage tank with LNG then uses natural gas vapor to add additional heat to saturate the fuel in the storage tank. The vehicle fuel system is equipped with a special overflow tank into which excess LNG passes during the fill. However, this solution requires a special fuel station where the vehicle must be filled.

Another proposed solution utilizes an overflow tank, but also uses special main tanks that remain hydraulically full to maintain sufficient pressure to the engine no matter the liquid's saturation pressure. However, the special fuel tanks add extra cost and complexity to the system.

SUMMARY

Disclosed is an LNG delivery system that overcomes the aforementioned shortcomings of the prior art. In an embodiment the system uses a system of one or more main tanks along with a reserve tank wherein the tanks can be mounted on a movable vehicle. The main tanks may utilize a pressure building circuit of the type sometimes used on stationary cryogenic cylinders. This type of pressure building circuit utilizes a gravity to feed liquid cryogen into a vaporizer. Upon vaporization of the liquid, its volume expands and the evolved gas is routed to a vapor space above the cryogen in the main tank, building a head of vapor pressure above the liquid phase in the tank. Alternatively, gas from downstream in the fuel system (after the heat exchanger) can be pushed back to the vapor space by means of mechanical action. U.S. patent application Ser. No. 14/044,622 describes a related device and method for such a mechanical pressure building action and is incorporated herein by reference.

Neither the traditional-style pressure building circuit nor the mechanical action pressure builder on a vehicle storage tank can alone maintain a constant supply of pressurized LNG. Since LNG vehicle tanks are used in mobile applications, any vapor pressure that is built above the liquid phase will quickly collapse as soon as the vehicle is in motion and the liquid and vapor phases mix. It may take an inconvenient amount of time, such as an hour, to add enough heat in this fashion to fully saturate the bulk of LNG in the tank.

Therefore, in addition to a tank using a form of pressure-building, a reserve tank is used in the system that stores saturated liquid that the vehicle can use to drive while the main tank(s) are being saturated. Once the liquid in the main tanks is saturated, the main tank(s) fuel the vehicle with their now-saturated liquid and refill the reserve tank, which will be stored until next fill.

In one aspect, there is disclosed a cryogenic fluid delivery system comprising: a main tank system, the main tank system including a main tank adapted to contain a first supply of cryogenic liquid, the main tank including a head space adapted to contain a vapor above cryogenic liquid stored in the main tank; a reserve tank system, the reserve tank system including a reserve tank adapted to contain a second supply of cryogenic liquid, the reserve tank including a head space adapted to contain a vapor above cryogenic liquid stored in the reserve tank; a pressure building circuit adapted to delivery vapor to the head space of the main tank to build pressure in the main tank; a fuel delivery line that supplies cryogenic fuel from either the main tank or the reserve tank to a use device; wherein the reserve tank stores saturated cryogenic fuel that is delivered to the use device via the fuel delivery line while the cryogenic liquid in the main tank is being saturated, and wherein the fluid delivery system switches to delivering cryogenic fuel from the main tank to the use device via the fuel delivery line upon saturation of the cryogenic liquid in the main tank Other features and advantages should be apparent from the following description of various embodiments, which illustrate, by way of example, the principles of the disclosure.

DETAILED DESCRIPTION

Before the present subject matter is further described, it is to be understood that this subject matter described herein is not limited to particular embodiments described, as such may of course vary. It is also to be understood that the terminology used herein is for the purpose of describing a particular embodiment or embodiments only, and is not intended to be limiting. Unless defined otherwise, all technical terms used herein have the same meaning as commonly understood by one skilled in the art to which this subject matter belongs.

Figure 1:
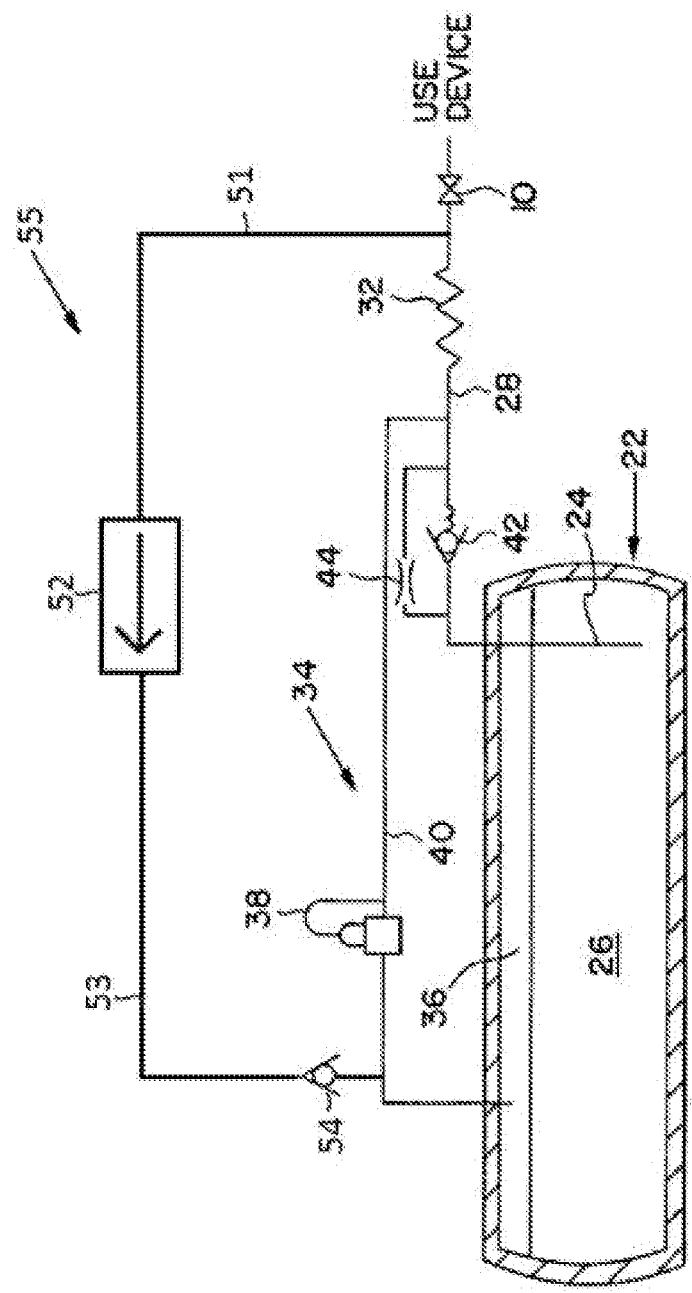
FIG. 1 shows an example of a prior fuel delivery system.

FIG. 1 shows an example of a fuel delivery system such as the type described in U.S. patent application Ser. No. 14/044,622, which is incorporated herein by reference. A cryogenic tank 22 contains cryogenic product, such as LNG, that includes liquid cryogen 26 with vapor space 36 above the liquid cryogen. A liquid line 24 communicates with the bottom region of the tank 22 where the liquid 26 is contained. As used herein, a "line" can be any type of tubing or piping through which fluid can flow. A product withdrawal line 28 connects the liquid line 24 to the gas use device such as a vehicle engine. A heat exchanger or vaporizer 32 is located in a withdrawal line 28 to vaporize the cryogen before it is delivered to the use device. A valve 10 in the withdrawal line 28 represents, for example, an automatic valve.

With reference still to FIG. 1, an economizer circuit 34 includes a vapor line or tube 40, which communicates with the vapor space 36. The vapor tube 40 includes an economizer regulator 38, which is set at a predetermined pressure threshold. A liquid line 24 communicates with liquid 26 in the tank 22. When the pressure in tank 22 exceeds the pressure set point of regulator 38, vapor 36 may be withdrawn through the vapor line 40 and to the use device through the withdrawal line 28. This results in a lowering of the pressure in the tank 22. Due to the horizontal nature of LNG vehicle fuel tanks, there is often sufficient hydrostatic pressure to cause liquid 26 to be withdrawn even when the regulator 38 is open. Therefore, a biasing relief valve 42 is included in the liquid line 24 to cause the economizer circuit 34 to be the path of least resistance out of the tank 22 when the regulator 38 is open. A small orifice 44 is located in parallel with relief valve 42 to allow back flow to the tank during transient periods of high to low use.

As shown in FIG. 1, an active pressure building circuit 55 can be used to build head pressure in tank 22. The pressure building circuit 55 includes an inlet line 51, which branches off withdrawal line 28 downstream of the vaporizer 32. A flow inducer 52 causes vaporized gas to flow from the inlet line 51 to an outlet line 53 leading back to the tank 22. The outlet line 53 returns the gas to the vapor line 40 through a check valve 54.

Figure 2:
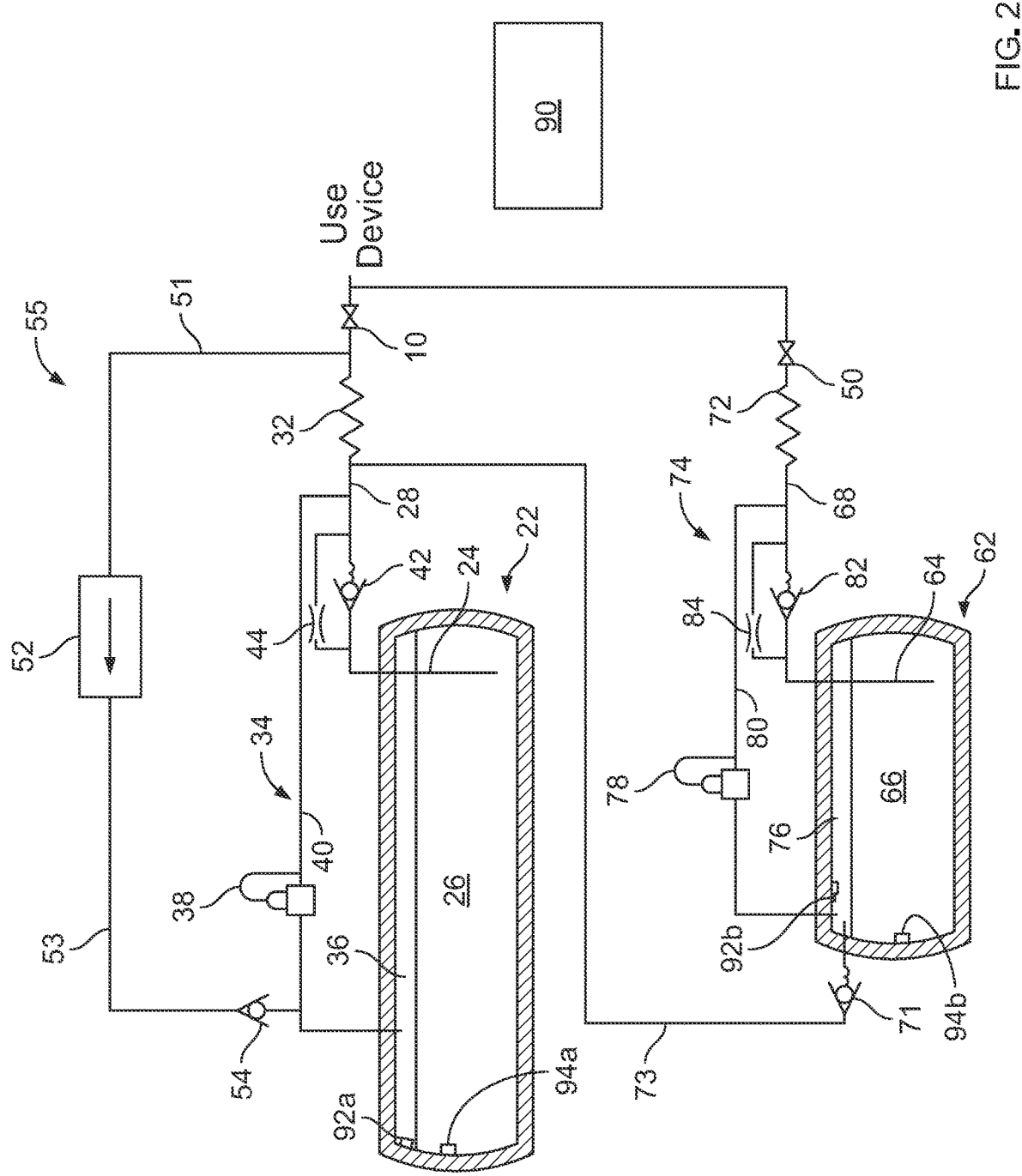
FIG. 2 shows an example embodiment of a fuel delivery system with a reserve tank and a main tank.

FIG. 2 shows an example embodiment of a fuel delivery system with a reserve tank 62 and a main tank 22. The tank 22 and 62 may be constructed, for example, of a single outer vessel with one or more insulated inner vessels. A vacuum space is located between the vessels within the outer vessel. Other configurations of the tanks 22 and 62 are possible.

In the embodiment of FIG. 2, the system includes a pressure building circuit 55 as described with respect to FIG. 1. The reserve tank 62 includes all of the same components as tank 22 (described above with reference to FIG. 1) and connects to the use device in parallel via a fuel line 75. For example, the reserve tank 62 includes liquid 66 and the vapor space 76 located above the liquid 66.

The reserve tank 62 includes an economizer circuit 44 a vapor line or tube 80, which communicates with the vapor space 76. The vapor tube 80 includes an economizer regulator 78, which is set at a predetermined pressure threshold. A liquid line 64 communicates with liquid 66 in the tank 62. When the pressure in tank 62 exceeds the set point of regulator 78, the vapor 76 may be withdrawn through the vapor line 70 and to the use device through the fuel line 75. This results in a lowering of the pressure in the tank 62. A biasing relief valve 82 is included in the liquid line 64 to cause the economizer circuit 74 to automatically be the path of least resistance out of the tank 62 when the regulator 78 is open. A small orifice 84 is located in parallel with the relief valve 72 to allow back flow to the tank during transient periods of high to low use With reference still to FIG. 2, a line 73 is the fill line for the tank 62 and tees into the withdrawal line 28. A check valve 71 in the line 73 prevents flow back from tank 62 into the main tank 22 system.

Figure 3:
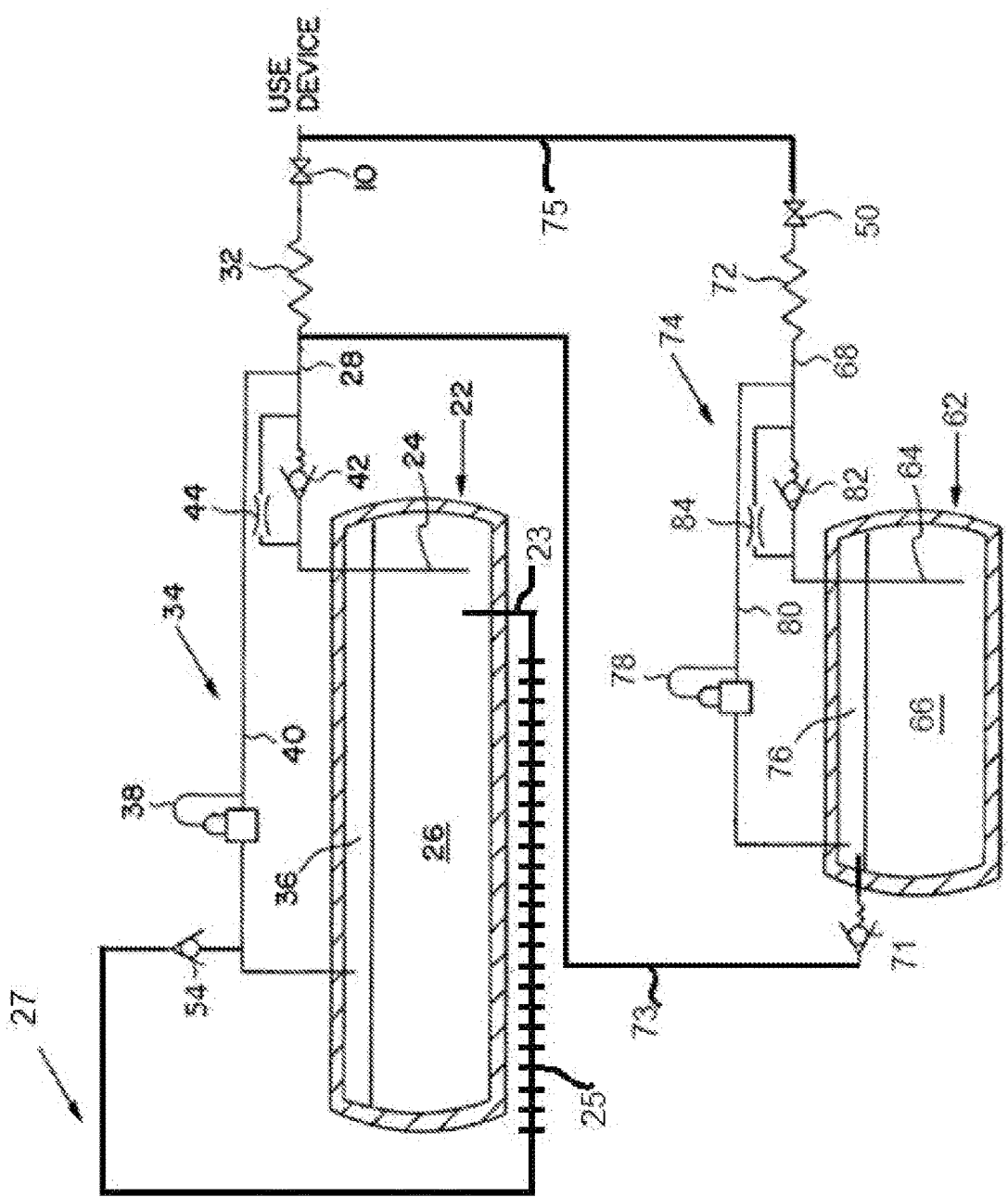
FIG. 3 shows another embodiment of the fuel delivery system with a main tank using a traditional style pressure building loop.

FIG. 3 shows another embodiment of the fuel delivery system with a main tank 22 and a reserve tank 62 as described above with reference to FIG. 2. The system of FIG. 3 includes a traditional style pressure-building loop or circuit 27, which is used to build pressure within the main tank 22. In this embodiment, a withdrawal line 23 extends downwardly from the liquid 26 in the tank 22. The withdrawal line 23 includes a vaporizer 25. The liquid 26 exits the withdrawal line 23 via a gravity feed. The exiting liquid 26 passes through the vaporizer 25, where it is changed to a vapor, and returns to the vapor space 36 through a check valve 54. In this manner, the pressure building circuit 27 increases pressure within the main tank 22.

In use, the reserve tank(s) retain a supply of previously saturated liquid. When the use device is filled, only the main tank(s) is filled with cold liquid. The reserve tank contains enough fuel to drive the use vehicle until the main tank becomes saturated. Pursuant to one method, the reserve tank is maintained in a normally empty state such that the reserve tank is empty upon arrival to the fuel station. Upon arrival at a fuel station, the liquid in the main tank is manually emptied into the reserve tank. The main tank is then filled with cold liquid at the fuel station. The use device uses fuel from the reserve tank while the main tank is saturated. When the reserve tank is nearly empty, the system switches to using fuel from the main tank for the use device. The use device can then operate until the main tank is nearly empty.

In an alternate process, the reserve tank is maintained in a normally full state such that the reserve tank is full of liquid upon arrival to a fuel station. The main tank is then filled with cold liquid fuel station. The main tank is saturated while the use device uses fuel from the reserve tank. When the reserve tank is nearly empty, the use device switches to using fuel from the main tank. As the main tank becomes fully saturated, the reserve tank refills with liquid from the main tank. When the reserve tank is full, the feeling of the reserve tank is stopped and the use device continues while only using fuel from main tank. This device can then drive until the main tank is nearly empty.

An example setup and operation of the described system for fueling an engine is now described using numerical values as non-limiting examples. In an example embodiment, the system for fueling an engine needs 10 barg inlet pressure. The economizer 38 has a set pressure of 12 barg and the economizer 78 has a set pressure of 11 barg. When the truck arrives at the fuel station, the reserve tank is ~90% full of liquid saturated at 11 barg and the main tanks are nearly empty, but the liquid that remains is saturated at 11 barg. The main tanks are filled with cold liquid saturated at, for example, 4 barg. After the fill, all tanks are full; the main tank is full of liquid saturated at just above 4 barg, and the reserve tank is full of liquid saturated at 11 barg. The valve 10 is in a closed state and the valve 50 is in an open state.

Continuing the example, the truck can operate using the liquid in the reserve tank 62 for the first 30 minutes or 1 hour of driving. During this time, the pressure building system 55 or 27 is acting on the main tank alone to build pressure and saturate the liquid in the main tank to 11 barg. By the time the reserve tank 62 is nearly empty, the main tank has sufficient pressure to be able to provide a constant source of high pressure to the engine. The control valve 10 will then open and the valve 50 will close. Then the pressure building system will build pressure up to 12 barg. When the liquid level in the main tank 22 falls to a predetermined threshold (such as, for example 60-70%), then the valve 50 will open and the valve 10 will close. This causes the reserve tank 62 to refill from the main tank 22 while providing high pressure gas to the engine. When the reserve tank 62 is full, the valve 50 will close and the valve 10 will open and the pressure building system will only maintain 11 barg. Then the vehicle will drive for the remainder of the fuel in the main tanks.

In an embodiment, further control can be provided to keep the reserve tank pressure down while driving by strategically switching to use the reserve tank and also keep it filled to a desired level. In this embodiment, the system includes a control system, including a controller indicated at 90, main tank and reserve tank pressure sensors indicated at 92a and 92b and main tank and reserve tank liquid level sensors indicated at 94a and 94b in FIG. 2, that takes inputs on the fill levels and pressure levels of each of the main tank 22 and the reserve tank 62. Additionally, to provide further control, the pressure building system of the main tank can strategically build pressure to different amounts depending on the level in the reserve tank. For example, immediately after fueling, it is undesirable for the main tank to build pressure greater than that of the reserve tank because then the reserve tank can begin to fill with perhaps cold liquid. Instead, it is desirable for the main tank to only build pressure to just less than the reserve tank until the reserve tank is nearly empty. Thereafter, it builds pressure to a higher setpoint and later fill the reserve tank as mentioned above with primarily saturated liquid. This level of control is easily attainable with standard pressure sensors, level sensors and solenoid valves known in the art.

In any of the embodiments, multiple main tanks can be connected in parallel, sharing a fill connection, sharing return gas line 53, and sharing withdrawal line 28.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

The invention claimed is:

1. A cryogenic fluid delivery system comprising:
   a main tank system, the main tank system including a main tank adapted to contain a first supply of cryogenic liquid, the main tank including a head space adapted to contain a vapor, the main tank system further including a main liquid withdrawal line and a main economizer circuit in communication with the main liquid withdrawal line and the head space of the main tank, the main economizer circuit including a main regulator configured to open to direct the vapor from the head space of the main tank to the main liquid withdrawal line when a pressure in the main tank rises above a predetermined main tank maximum pressure;
   a reserve tank system, the reserve tank system including a reserve tank adapted to contain a second supply of cryogenic liquid, the reserve tank including a head space adapted to contain a vapor, the reserve tank system further comprising a reserve liquid withdrawal line and a reserve economizer circuit in communication with the reserve liquid withdrawal line and the head space of the reserve tank, the reserve economizer circuit including a reserve regulator configured to open to direct the vapor from the head space of the reserve tank to the reserve liquid withdrawal line when a pressure in the reserve tank rises above a predetermined reserve tank maximum pressure, wherein the predetermined reserve tank maximum pressure is less than the main tank maximum pressure;
   a pressure building circuit adapted to deliver vapor to the head space of the main tank to build pressure in the main tank;
   a fuel delivery line;
   at least one fuel selection valve in communication with the fuel delivery line, wherein the main tank is in fluid communication with a use device through the main liquid withdrawal line and the fuel delivery line and the reserve tank is not in fluid communication with the use device through the fuel delivery line when the at least one fuel selection valve is in a first state and the reserve tank is in fluid communication with the use device through the main liquid withdrawal line and the fuel delivery line and the main tank is not in fluid communication with the use device when the at least one fuel selection valve is in a second state;
   a reserve fill line in fluid communication with the reserve tank and the main liquid withdrawal line of the main tank; wherein said reserve fill line, said reserve liquid withdrawal line, and said fuel delivery line are configured to deliver a liquid portion of the first supply of the cryogenic liquid from the main tank to the reserve tank via the reserve fill line as the cryogenic liquid flows from the reserve tank to the use device via the reserve liquid withdrawal line and the fuel delivery line when the at least one fuel selection valve is in the second state.

2. The system as in claim 1,
   further comprising:
   a main vaporizer positioned within the main liquid withdrawal line; and
   wherein the pressure building circuit comprises a flow inducer and a gas return pathway in fluid communication with an outlet of the main vaporizer and the head space of the main tank, wherein the flow inducer causes gas to flow from the main vaporizer to the head space of the main tank.

3. The system as in claim 1, further comprising a controller, a main tank pressure sensor, a reserve tank pressure sensor, a main tank liquid level sensor and a reserve tank liquid level sensor configured to sense fill levels and pressure levels of each of the main tank and the reserve tank and automatically switch the at least one fuel selection valve between the first state and the second state based on the sensed fill levels and pressure levels.

4. The system as in claim 3, wherein the controller is configured to automatically switch the at least one fuel selection valve from the second state to the first state when the main tank reaches a predetermined pressure as determined by the main tank pressure sensor and to automatically switch the at least one fuel selection valve from the first state to the second state when a liquid level in the main tank drops to a predetermined main tank liquid level as determined by the main tank liquid level sensor.

5. The system as in claim 1, wherein at least one of the main tank and the reserve tank is formed or an outer tank and an inner tank inside the outer tank with a vacuum space between the outer tank an inner tank.

6. The system as in claim 1, wherein a main biasing relief valve is included in the main liquid withdrawal line to cause the main economizer circuit to be a path of least resistance out of the main tank when the main regulator is open.

7. The system as in claim 6, wherein a main small orifice is located in parallel with the main biasing relief valve to allow back flow to the main tank during transient periods of high to low use.

8. The system as in claim 1 wherein a reserve biasing relief valve is included in the reserve liquid withdrawal line to cause the reserve economizer circuit to be a path of least resistance out of the reserve tank when the reserve regulator is open.

9. The system as in claim 8, wherein a reserve small orifice is located in parallel with the reserve biasing relief valve in the reserve liquid withdrawal line to allow back flow to the reserve tank during transient periods of high to low use.

10. The system of claim 3 wherein the controller is configured to automatically switch the at least one fuel selection valve from the second state to the first state when the main tank reaches a predetermined pressure as determined by the main tank pressure sensor and a liquid level within the reserve tank drops to a predetermined reserve tank liquid level as determined by the reserve tank liquid level sensor.

11. The system of claim 2 wherein the reserve fill line is in liquid communication with the main liquid withdrawal line between the main tank and an inlet of the main vaporizer.

12. The system of claim 1 further comprising a check valve positioned within the reserve fill line, said check valve configured to prevent flow from the reserve tank towards the main.

* * * * *